July 18, 1944.   C. W. THOMAS   2,354,094
METHOD OF MAKING NOTEBOOK PLASTIC BINDING
Filed March 17, 1942    2 Sheets-Sheet 1

INVENTOR.
CHARLES W. THOMAS.
BY Joshua R. H. Potts
ATTORNEY.

July 18, 1944.     C. W. THOMAS     2,354,094

METHOD OF MAKING NOTEBOOK PLASTIC BINDING

Filed March 17, 1942     2 Sheets—Sheet 2

INVENTOR.
CHARLES W. THOMAS.
BY Joshua R. H. Potts
ATTORNEY.

Patented July 18, 1944

2,354,094

UNITED STATES PATENT OFFICE 2,354,094

METHOD OF MAKING NOTEBOOK PLASTIC BINDINGS

Charles W. Thomas, Elkins Park, Pa., assignor to Keystone Index Card Company, Philadelphia, Pa., a corporation of Delaware Application March 17, 1942, Serial No. 435,022

5 Claims. (Cl. 18—56)

My invention relates to methods of making notebook plastic bindings, and has for a general object an improvement in the methods by which these bindings may be made and assembled.

So-called plastic bindings which are currently known and used have been designed to take the place of the familiar metal ring binder of the loose-leaf note book and in many respects have proved to be superior to it.

However, certain defects in the making of these bindings and note books are present, and it is a broad object of my invention to alleviate some of these difficulties and provide better methods.

Generally speaking, these plastic bindings have been made of materials such as ethyl cellulose, cellulose acetate, and other materials having generally similar characteristics.

One very desirable attribute of such materials is that they soften for forming purposes under the influence of heat and after the pressure is released and the temperature returned to normal the new form will be retained.

In the fabrication of such materials it has been the practice to cut sheets of this material at spaced points so to form a number of outstanding parallel teeth, similar to the teeth of a comb, and after these teeth are cut they are formed around a mandrel while heat is applied to bring them into a ring formation. Loose-leaf note book pages are strung upon the individual teeth and are held in desired assembled relation by virtue of the ring shape of each tooth.

I have noticed that the perforations of the loose-leaf sheets, through which these teeth pass, are often torn or frayed by the jagged edges of the teeth of the plastic binding. These jagged edges, of course, occur because of the cutting operations which remove the material between the spaced teeth. In this respect the plastic binding has not been satisfactory and is in fact inferior to the metal ring of the prior art which the plastic binding was designed to improve.

A more limited object of my invention is to provide methods by which the teeth of the binding which form the ultimate ring may be made smooth and non-resistant to the turning of the pages.

I propose to do this in a novel and economical manner without the use of polishing or grinding operations, which would be costly and laborious in view of the large number of teeth customarily employed in a plastic binding.

Another object of my invention is to obtain all of the advantages of the known plastic bindings and couple with these advantages the additional ones which come from forming plastic bindings and book covers from a single piece of material. I propose to accomplish this object without a prohibitive increase in cost over the known plastic bindings now employed; in fact my improved product in some instances may be made for a smaller sum of money than the known and inferior plastic bindings.

Other and more detailed objects and advantages will appear hereinafter as the description proceeds.

In accomplishing the above objects I preferably employ as a base a light high grade rag or Bristol paper of 10 to 15 points in thickness and treat such paper at desired parts thereof to impart to it the characteristics of the thermoplastic materials above mentioned which are desirable in plastic bindings. In treating these portions of the paper I am able to provide the smooth surfaces for the teeth which make for longer service from the loose-leaf pages, and where desired I may form the cover and binding into one unitary whole and print titles and other information on the desired parts, such as the title back bones, notwithstanding the plastic character of the binding portions.

My invention, therefore, comprises the process of forming book binding teeth so as to improve their cooperation with loose-leaf pages; further, my invention embraces the process of forming the teeth, and in addition the means for securing the teeth in closed and leaf-holding position.

References may now be had to the accompanying drawings for further explanation and like numbers herein denote corresponding parts on the drawings.

Figure 1:
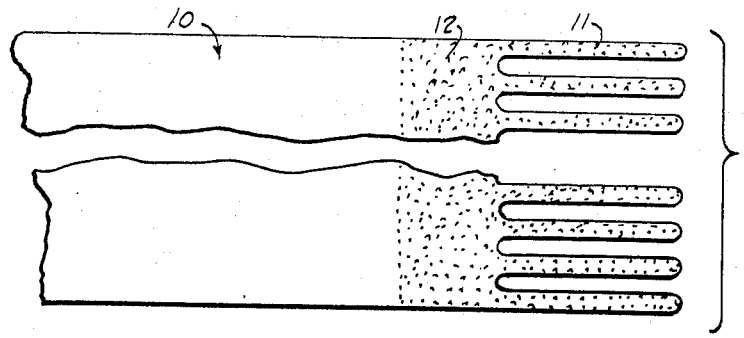
Figure 1 is a top plan view of a plastic binding in its opened condition prior to combination with grouped note book pages.
Figure 2:
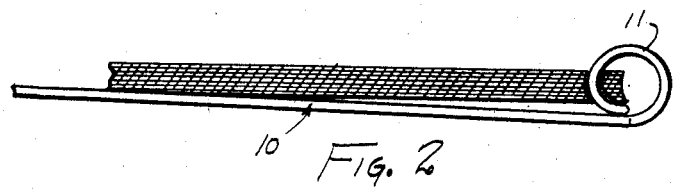
Figure 2 is an end view of the same binding after the note book pages have been secured to the binding teeth and the teeth have been turned into binding relation.

Referring now to the form of the invention shown in Figures 1 and 2, a sheet 10, preferably of a high grade rag or Bristol paper of ten to fifteen points in thickness, may be cut to provide a number of parallel and separated outstanding teeth 11, whose length and width depend upon the number of pages desired to be held in assembled relation. The spacing of the teeth may be varied within wide limits and their number as well may be varied according to the particular binding task at hand.

While the sheet 10 is shown broken away at the left hand side of the figure, it may be extended sufficiently to form a cover member for a looseleaf note book instead of forming only a plastic binding member to be attached to a cover, or when shortened to a greater extent to be held in place by the assembled sheets themselves.

After the teeth have been formed in the desired number and dimensions, the edge which carries the teeth is preferably dipped into a thermoplastic coating solution to an extent illustrated by the shaded portion 12.

While the characteristics of the thermoplastic coating may be varied within considerable limits without jeopardizing the effectiveness or efficiency of my improvements, the following are my preferred formulae:

In general I classify these coatings by the terms ethyl cellulose, cellulose acetate, and chlorinated rubber. In many of these formulae the method of compounding is substantially the same, and merely requires the ingredients to be placed in a container and be thoroughly mixed together.

The ethyl cellulose coating preferably comprises 80% by weight of the solvent, and of this 80% toluol comprises 80% and 20% is alcohol. With this solvent I combine other ingredients in the amount of 20% of the entire weight of the coating. The other ingredients in the amount of 20% comprise 80 parts ethyl cellulose, 15 parts coumarone indene, and 5 parts castor oil.

In the case of ethyl cellulose acetate coating I employ the following ingredients in the amounts specified in 100 parts of the coating by weight:

20 parts cellulose acetate, 10.2 parts methyl phthalyl ethyl glycollate (Santiciser M. 17), 2.5 parts mixture of ortho and tara toluene ethyl sulfonamides (Santiciser 8), .03 part fatty alcohol (Duponol ME), 37 parts methyl ethyl ketone, 15 parts acetone and 15 parts diacetone alcohol.

In the case of the chlorinated rubber coating I employ 75% of solvent by weight of the entire coating comprising 70% toluol and 30% acetone. The other ingredients form 25% of the whole and comprise 75% chlorinated rubber, 10% coumarone indene, 5% linseed oil, and 10% tricresyl phosphate.

After the teeth 11 and the shaded section 12 have been dipped in one of the above described solutions a drying period or operation follows, and where a more rigid tooth construction is desired subsequent dipping and dryings are employed to form thicker coating.

After the final coating has dried the teeth are bent into the desired ring formation while in a heated condition. Due to the thermoplastic characteristics of the coating the teeth are quite pliable under the influence of heat and if held in the bent or formed condition until cold they will retain the ring formation. The teeth are then "stretched out" or flattened and a plurality of loose-leaf sheets having proper openings for registry with the teeth are strung upon the teeth, and hold the sheets in assembled relation as shown in Figure 2. Upon release of holding pressure the teeth return to ring formation.

It can be seen that if the sheet of paper forming the "core" is extended sufficiently it may bear titles and other information which may be printed on the sheet prior to any coating operations.

Likewise the base of the teeth and the area immediately adjacent thereto may carry printed matter, which will receive protection by virtue of the thermoplastic coating. Due to the impervious characteristics of the coating the protection to the printed matter will be gained and the printed matter will be readable for a longer period of time through the transparent coating.

Figure 3:
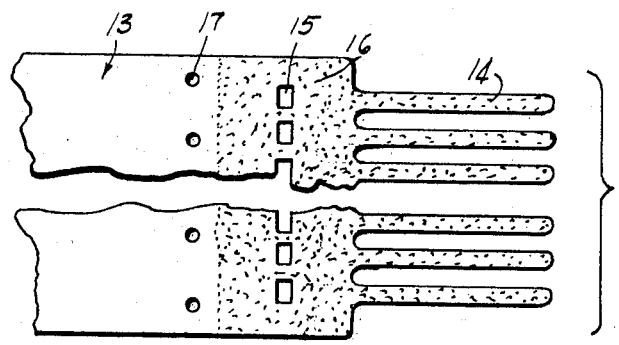
Figure 3 is a top plan view, in opened relation, of a modified form of binding and cover illustrating means of holding the teeth.

In the form shown in Figure 3 a sheet 13 of the same type paper described above is employed and teeth 14 are formed in a manner similar to the teeth 11 of Figure 1. In this case a plurality of slots 15 is formed in spaced relation to the base of teeth 14 with one slot for each one of the teeth 14. Each of the slots 15 is somewhat wider than the width of the teeth 14 for a purpose later to be described, and preferably the area which includes the slots is coated with one of the above mentioned coatings at the same time the teeth are coated; the coated area is indicated by the shaded area at 16. A plurality of metallic rivets or eyelet holes 17 is formed along the margin of the sheet 13 opposite the edge which bears the teeth 14.

Figure 4:
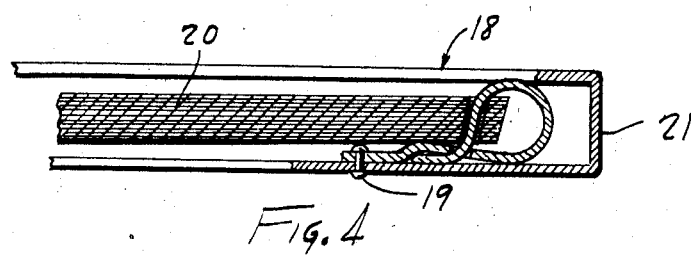
Figure 4 is a view similar to Figure 2 but including the teeth-holding construction of Figure 3.

Referring now to Figure 4, the plastic binding of Figure 3 is shown in assembled relation with a U-shaped cover member 18 attached thereto by metallic rivets or eyelets 19, which pass through openings 17 of the binding and through registering openings of the cover member 18.

The coated area of the binding including the teeth 14 may be heated and the teeth formed into desired ring formation. When the binding cools the ring formation of the teeth remains, and the free ends of the teeth may be passed through the registering openings of loose-leaf sheets. The teeth are then passed through the slots 15 and wedged into place. However, due to the holding function of the slots the heating and pre-forming operations may be omitted in certain instances.

If desired the assembly of sheets 20 upon teeth 14 may be followed by a lacing of teeth through the slots 15 before the binding is attached to the cover member 18. In either case, if desired the edge 21 of the cover member 18 may serve as the title backbone for the book. Convenient inspection of the title on a bookshelf is thus possible.

If at any time it is desired to remove or replace pages of the book, the teeth 14 may be pulled from slots 15 with sufficient ease, and after replacement of sheets they may be reinserted into the slots and locking position of Figure 4.

Figure 5:
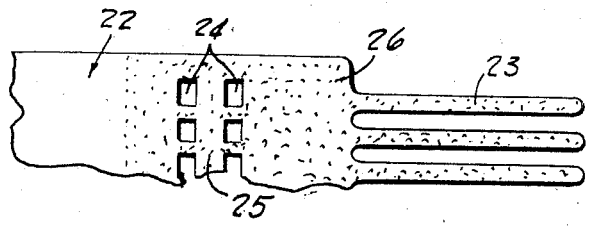
Figure 5 is a top plan view of a modified form of binding and cover strip in opened relation.

In Figure 5 a unitary binding and cover are shown. In this case I employ a sheet of high grade rag paper 22, and cut the teeth 23 from one edge in a manner similar to the binding of Figure 3. Adjacent the base of teeth 23, but in somewhat spaced relation thereto, I place a parallel and spaced pair of rows of slots 24, and thus provide an intermediate bridge strip 25 of paper between each opposed pair of slots 24. A coating 26 is indicated by the shaded area, and embraces the teeth and slotted portions of the sheet 22.

Figure 6:
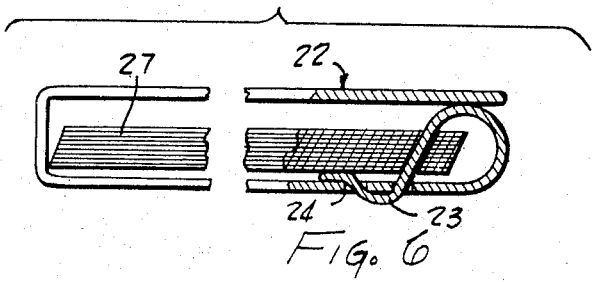
Figure 6 is an end view similar to Figure 2 with the modified cover member and teeth-holding means of Figure 5 and a modified cover member.

The binding of Figure 5 is shown in Figure 6 in assembled relation with a plurality of sheets 27, and it will be noted that in this case the sheet is of sufficient dimensions to form a complete cover by folding it over into a U-shaped formation with the teeth 23 arranged along one edge. The teeth may be heated and bent to proper form to be passed through one series of slots 24 and back into the interior of the cover through the spaced row of slots 24. After cooling, the sheets are assembled on the teeth and the "lacing" operation follows. If desired the heating and pre-forming steps may be omitted and the inner free ends of the teeth may be secured to the cover by adhesively covered binding tape. Due to the thermoplastic characteristics of the coatings mentioned pressure by a hot iron will cause the ends to lie in close proximity to the cover.

While the lacing of the teeth in this manner holds the teeth and sheet in the desired relation, it can readily be seen that the teeth may be "unlaced" to free the sheets for replacement. Of course, the teeth maintain the ring shape while at ordinary temperatures due to the stiffening characteristics of the coating 26 which may be made of any one of the three solutions above described.

Figure 7:
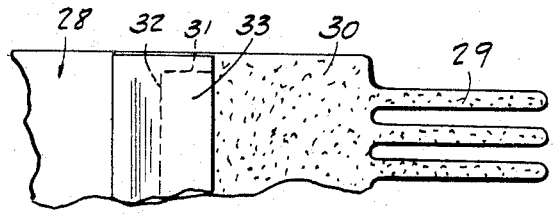
Figure 7 is a modified form of binding and teeth-holding member arranged in the general opened relation of that of Figure 1.

In Figure 7 a sheet of the same paper described above is cut to form a plurality of teeth 29, and the shaded area 30 of the teeth and the sheet are coated with one of the solutions set out above. The dotted lines 31 and 32 define an area of the sheet 28 which may be covered with a mucilaginous material for the anchorage of a pocket strip of pressboard 33 to be described later in connection with Figure 8.

Figure 8:
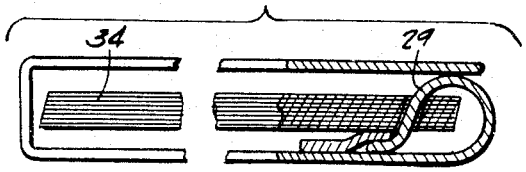
Figure 8 is an end view of the modified construction shown in Figure 7 and arranged in the relation of the binding of Figure 2.

In Figure 8 the binding of Figure 7 is shown in assembled relation with a plurality of sheets 34 and the ends of teeth 29 are tucked beneath the free edge of the strip of pressboard 33 and they are held in proper assembled relation due to the rather stiff characteristics of the pressboard and its anchorage to the sheet 28.

If preferred each corner of the pressboard may be provided with a rivet opening and then be secured to the sheet 28 by means of an eyelet or rivet. The sheet 28 may be bent into U-shaped formation to provide a cover for the loose-leaf sheets as described in connection with Figure 6. In this case also the sheets are removable by pulling the teeth from the pocket formed by strip 33.

In all instances of the forms above described it will be noted that the teeth are formed before the paper is coated and that if there are any rough edges left on the teeth from the cutting operations the coating covers the jagged edges and serves to cause movement of the loose-leaf sheet perforations to be possible without tearing the perimeters of the loose-leaf sheet openings.

In some instances it is desirable to carry on the coating operations in advance of cutting the teeth and in such instances the teeth are cut by a heated die and the coating on opposite sides of the sheet is stretched and fused into a tooth covering with comparatively smooth edges. As the die wears there may be some rough edges and in such instances I employ a subsequent dipping operation to seal the teeth edges and provide a smooth surface upon which the loose-leaf sheet openings may move.

While I have specifically described the use of heat to render the thermoplastic coated portions of the sheet more plastic so as to form them into leaf holding shape and retain this shape upon cooling, I may accomplish this object by forming the teeth into leaf holding shape before the solvent of the thermoplastic coating has evaporated to such an extent that the flexible character of the teeth has been lost.

In other words, after the coating is accomplished I dry the coating until it is tack-free then form the teeth into the desired shape and hold them in this shape until evaporation of the solvent is complete. In this method there is a notable absence of stresses in the coating.

A complete binding and a cover sheet serve the purposes of a customary portable notebook and with great convenience and economy may also serve the ordinary function of a file folder. In such instances the number of teeth may be reduced since the problem of withstanding heavy stresses is not present as prominently in connection with file folders as it is with the portable notebook.

While I have shown and described my preferred constructions and methods, I do not wish to be limited to the precise details shown and described, but wish to avail myself of all the variations coming properly within the scope of the appended claims.

I claim:

1. The process of making a notebook binding comprising cutting a number of outstanding teeth from an edge of a sheet of paper material, coating portions of said sheet including the said teeth with a thermoplastic material, heating portions of the said sheet including said teeth to render said material plastic, forming said teeth into the desired shape while said material is in plastic condition and maintaining said teeth in their newly formed shape until cold.

2. The process of making a notebook binding comprising coating a portion of a sheet of pliable material with a thermoplastic material having form sustaining characteristics at normal temperatures, cutting a plurality of teeth along an edge of said pliable material, fusing the edges of said teeth, forming said teeth into the desired shape while in a heated conditioned, and maintaining said teeth in the desired shape until they are sufficiently cool to retain said desired shape.

3. A method of making a notebook binding comprising the steps of impregnating a sheet of material having slight form sustaining characteristics with a material having greatly superior form sustaining characteristics under normal conditions, rendering coated portions of said sheet of a more pliable nature, forming portions into the desired shape, and maintaining said desired shape while restoring the form sustaining characteristics to said coated portions.

4. The process of making a notebook binding comprising cutting a number of outstanding teeth from an edge of a sheet of material of relatively slight form sustaining characteristics, coating portions of said sheet including said teeth with a material having greatly superior form sustaining characteristics under normal conditions, forming said teeth to leaf holding shape while said teeth are in abnormally flexible condition and holding said teeth in said shape while bringing said teeth to their normal form sustaining condition.

5. The process of making a notebook binding comprising cutting a number of outstanding teeth from an edge of a sheet of material of relatively slight form sustaining characteristics, coating portions of said sheet including said teeth with a material having greatly superior form sustaining characteristics under normal condition, forming said teeth into leaf holding shape while said coating retains an abnormal amount of solvent and flexible characteristics, and holding said teeth in said shape until abnormal flexibility disappears.

CHARLES W. THOMAS.